United States Patent
Veilleux, Jr.

(10) Patent No.: US 9,151,180 B2
(45) Date of Patent: Oct. 6, 2015

(54) LUBRICATION DRIVEN GAS TURBINE ENGINE ACTUATION SYSTEM

(75) Inventor: Leo J. Veilleux, Jr., Wethersfield, CT (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 576 days.

(21) Appl. No.: 12/815,456

(22) Filed: Jun. 15, 2010

(65) Prior Publication Data

US 2011/0302903 A1   Dec. 15, 2011

(51) Int. Cl.
| F02C 7/06 | (2006.01) |
| F01D 25/20 | (2006.01) |
| F01D 17/16 | (2006.01) |
| F01D 25/18 | (2006.01) |

(52) U.S. Cl.
CPC ............ *F01D 25/20* (2013.01); *F01D 17/16* (2013.01); *F01D 25/18* (2013.01); *F02C 7/06* (2013.01); *Y02T 50/672* (2013.01)

(58) Field of Classification Search
CPC ........... F01D 25/18; F01D 25/20; F02C 7/14; F02C 7/06
USPC ........................ 60/39.08; 184/6.11
See application file for complete search history.

(56) References Cited

U.S. PATENT DOCUMENTS

| 2,761,387 A | 9/1956 | Gaubatz |
| 2,780,172 A | 2/1957 | Coar |
| 3,011,308 A | 12/1961 | Wotring |
| 3,026,929 A | 3/1962 | Burns |
| 3,357,178 A * | 12/1967 | Meyers ................ 60/39.25 |
| 4,049,401 A * | 9/1977 | Smith .................... 55/401 |
| 4,171,611 A * | 10/1979 | Hueller ................ 60/39.08 |
| 4,708,030 A | 11/1987 | Cordner |
| 5,028,803 A | 7/1991 | Reynolds |
| 5,121,599 A * | 6/1992 | Snyder et al. ............ 60/779 |
| 5,159,808 A | 11/1992 | Kast |
| 5,220,793 A * | 6/1993 | McGlone et al. ......... 60/734 |
| 5,241,814 A | 9/1993 | Butler |
| 5,272,870 A | 12/1993 | Grieb et al. |
| 5,349,811 A * | 9/1994 | Stickler et al. .......... 60/776 |
| 5,365,732 A * | 11/1994 | Correa ................ 60/39.281 |
| 5,414,992 A | 5/1995 | Glickstein |
| 5,575,159 A | 11/1996 | Dittell |
| 5,694,764 A * | 12/1997 | Blain et al. .............. 60/787 |
| 6,035,626 A | 3/2000 | Wahl et al. |
| 6,176,076 B1 | 1/2001 | Ford |
| 6,182,435 B1 | 2/2001 | Niggemann et al. |
| 6,263,864 B1 | 7/2001 | Kelley |
| 6,286,299 B1 * | 9/2001 | Junquera ............... 60/39.08 |
| 7,063,734 B2 * | 6/2006 | Latulipe et al. ........... 96/189 |

(Continued)

FOREIGN PATENT DOCUMENTS

| EP | 2071140 | 6/2009 |
| FR | 2925594 | 6/2009 |

OTHER PUBLICATIONS

Extended European Search Report, dated Feb. 8, 2012, EP Application No. 11169357.8.

*Primary Examiner* — Gerald L Sung

(74) *Attorney, Agent, or Firm* — Carlson, Gaskey & Olds, P.C.

(57) ABSTRACT

A lubrication system for a gas turbine engine includes a variable output lubricant pump operable to supply lubricant to an actuator system.

8 Claims, 2 Drawing Sheets

(56) References Cited

U.S. PATENT DOCUMENTS

| | | | |
|---|---|---|---|
| 7,118,336 B2 * | 10/2006 | Waddleton | 416/1 |
| 7,185,496 B2 | 3/2007 | Herlihy | |
| 7,260,926 B2 | 8/2007 | Sabatino et al. | |
| 7,337,761 B2 | 3/2008 | Bickley | |
| 7,342,763 B2 | 3/2008 | Mladenik et al. | |
| 7,377,110 B2 * | 5/2008 | Sheridan et al. | 60/772 |
| 7,401,461 B2 | 7/2008 | Eick et al. | |
| 7,434,406 B2 | 10/2008 | Herlihy et al. | |
| 7,484,522 B2 | 2/2009 | Eick et al. | |
| 7,497,083 B2 | 3/2009 | Yates et al. | |
| 7,527,481 B2 | 5/2009 | Baryshnikov et al. | |
| 7,537,646 B2 | 5/2009 | Chen et al. | |
| 7,581,379 B2 * | 9/2009 | Yoshida et al. | 60/39.463 |
| 7,610,760 B2 | 11/2009 | Clements | |
| 7,908,840 B2 * | 3/2011 | Schwarz et al. | 60/39.08 |
| 7,984,606 B2 * | 7/2011 | Smith | 60/266 |
| 8,196,408 B2 * | 6/2012 | Khosla et al. | 60/734 |
| 2004/0011018 A1 * | 1/2004 | Bouiller et al. | 60/39.08 |
| 2005/0084388 A1 * | 4/2005 | Hayes et al. | 417/222.1 |
| 2005/0086971 A1 * | 4/2005 | Wells | 62/324.2 |
| 2006/0081419 A1 * | 4/2006 | Care et al. | 184/6.11 |
| 2009/0235631 A1 * | 9/2009 | Bocquet et al. | 60/39.08 |
| 2009/0313999 A1 * | 12/2009 | Hunter et al. | 60/772 |
| 2011/0023444 A1 * | 2/2011 | Veilleux, Jr. | 60/39.08 |

* cited by examiner

- A) Typical Fuel Pressure up to 200-2000 PSIA
- B) Typical Oil Supply 100 to 400 PSIA
- C) Typical Fuel Low Pressure Sump 40-150 PSIA
- D) Typical Oil Low Pressure Sump 6 PSIA to 20 PSIA
- E) Typical Atmosphere 2 PSIA to 15 PSIA
- F) Typical Actuator Sizing Point
- G) Typical Actuator Load Limit/Structure Limits Point

LUBRICATION DRIVEN GAS TURBINE ENGINE ACTUATION SYSTEM

BACKGROUND

The present disclosure relates to a gas turbine engine, and more particularly to a lubrication driven engine actuation system.

Gas turbine engines operate with a fuel system that typically supplies fuel for engine fuel burn and engine actuation operations. Engine fuel burn is the fuel supplied to the gas turbine engine combustor. Fuel for engine actuation is the fuel used as the working fluid to drive variable engine geometries through fuel powered actuators such as stator vane actuators, bleed valves and other hydromechanical systems. Such fuel powered actuation is often referred to as "fueldraulics."

SUMMARY

A lubrication system for a gas turbine engine according to an exemplary aspect of the present disclosure includes a variable output lubricant pump operable to supply lubricant to an actuator system.

A gas turbine engine according to an exemplary aspect of the present disclosure includes a lubricant system operable to supply lubricant to an actuator system and a lubricant distribution system and a fuel system operable to supply a burn flow to a combustor of the gas turbine engine.

A method of actuating variable engine geometries within a gas turbine engine according to an exemplary aspect of the present disclosure includes supplying lubricant to a gas turbine actuator system to provide variable engine geometries; and supplying fuel as a burn flow only.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
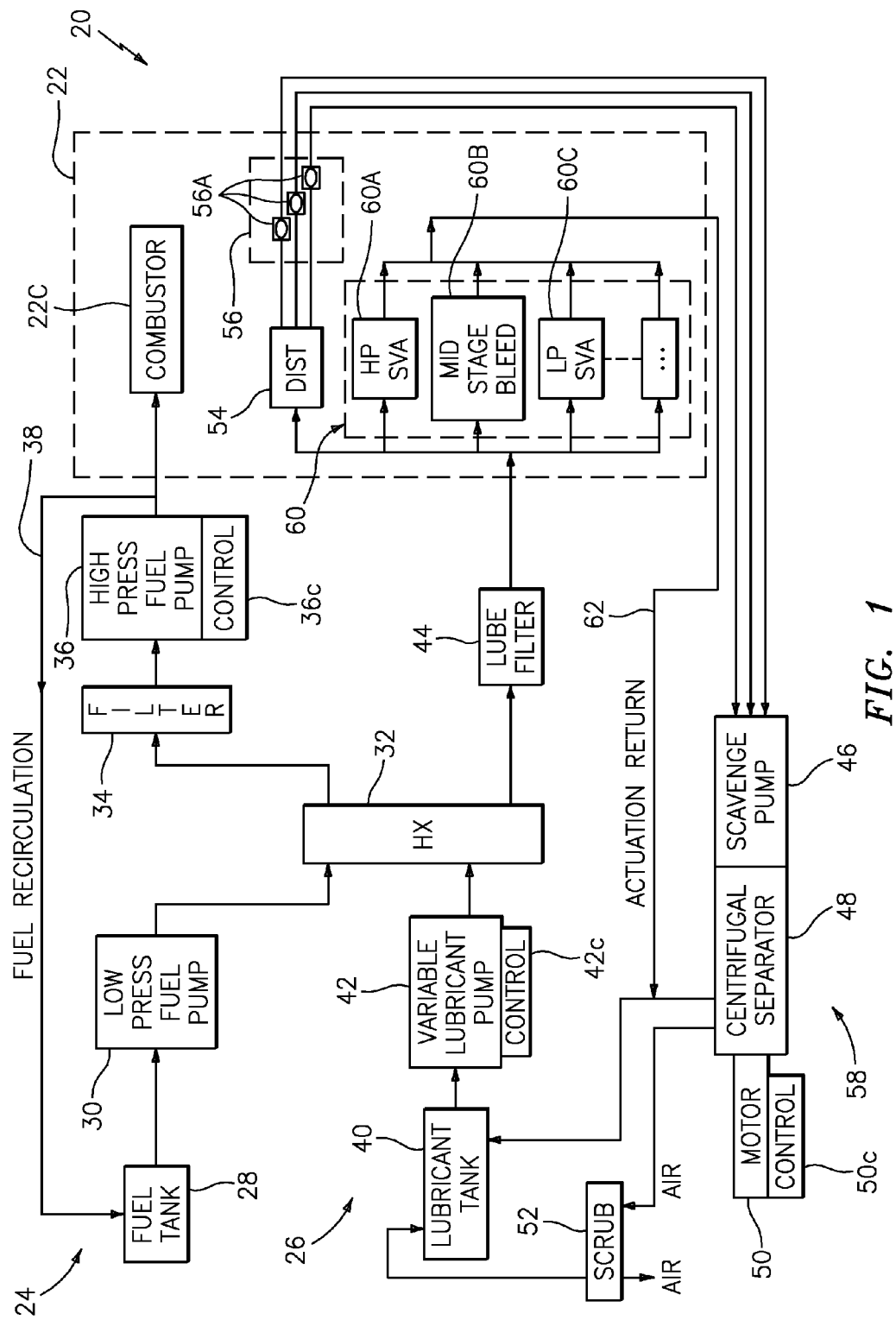
FIG. 1 is a general schematic view of gas turbine engine system embodiment for use with the present disclosure.

FIG. 1 schematically illustrates a gas turbine engine system 20 which includes a gas turbine engine 22 in fluid communication with a fuel system 24 and a lubrication system 26. While a gas turbine engine system 20 typically utilized for aircraft propulsion is schematically illustrated in the disclosed non-limiting embodiment, it should be understood that the disclosure is applicable to other gas turbine engine configurations, vehicles and gas turbines for power generation.

The fuel system 24 generally includes a fuel tank 28, low pressure fuel pump 30, a heat exchanger 32, a filter system 34, a high pressure fuel pump 36 and control 36c which supplies a burn flow of fuel to a combustor 22C of the gas turbine engine 22. Although particular components are illustrated in the disclosed, non-limiting embodiment it should be understood other fuel system components may alternatively or additionally be provided.

The fuel system 24 supplies fuel typically in quantities that are in excess of that required to fuel the gas turbine engine 22 such that excess fuel is recirculated through line 38. Even with recirculation, the fuel system 24 need only provides fuel quantities to accommodate the fuel burn operation, as the lubrication system 26 provides hydraulic power for engine actuation operations. The size and minimum pressure of the pumps 30, 36 are thereby readily reduced over fueldraulic systems. Typically, an approximate 20% reduction in fuel pump size may be achieved for mid thrust engines and the minimum fuel pressures may be reduced with the elimination of fueldraulic engine actuation requirements which will save power at cruise. The relatively smaller fuel pump sizing at windmill relight also reduces fuel waste.

The lubrication system 26 generally includes a lubricant tank 40, a variable output lubricant pump 42, the heat exchanger 32, a filter system 44, a scavenge pump 46, a centrifugal air/lubricant separator 48 driven by a motor 50 and an optional scrubber system 52. The heat exchanger 32 may be an air or fuel cooled system and may alternatively or additionally include a multiple of heat exchangers in a distributed arrangement. Although particular components are illustrated in the disclosed, non-limiting embodiment it should be understood other lubrication system components may alternatively or additionally be provided.

The lubrication system 26 supplies lubricant to a lubricant distribution system 54 which communicates lubricant to engine components 56 such as bearing components 56A, 56B, 56C. It should be understood that other components may alternatively or additionally receive lubricant from the lubricant distribution system 54. From the components 56, the lubricant is scavenged within a scavenge system 58 by the scavenge pump 46.

The centrifugal air/lubricant separator 48 is selectively driven by the motor 50 to remove air from the scavenged lubricant. The motor 50 is controlled to drive the centrifugal air/lubricant separator 48 to optimize air separation such that the lubricant tank 40 may be of a relatively small size as compared to conventional lubricant tanks which may be relatively larger to permit increased residence time for the lubricant to settle and allow air to escape from the lubricant.

The centrifugal air/lubricant separator 48 separates lubricant from the air and returns the lubricant to the lubrication tank 40 and dumps the air overboard. The scrubber system 52 may additionally be utilized to scrub the overboard air for any residual lubricant.

The lubrication system 26 selectively supplies lubricant to an actuator system 60 which includes a multiple of actuators such as a high pressure stator vane actuator 60A, a mid stage bleed actuator 60B, low pressure stator vane actuator 60C and others. It should be understood that other actuators, variable geometry and fluid driven systems may alternatively or additionally be driven by the lubricant system 26.

The variable output lubricant pump 42 utilizes a control 42c to optimize lubricant communication efficiency to assure adequate pressure is provided dependent on, for example, the number or actuators which are in operation. That is, the variable output lubricant pump 42 may operate in response to the control 42c at one speed to supply a desired lubricant output to the lubricant distribution system 54 and may operate at a second higher speed to supply the desired lubricant output to the lubricant distribution system 54 as well as supply the actuator system 60. The variable output lubricant pump 42 may alternatively be gearbox driven so speed is a function of engine speed and variable output is set by pump displacement or may be a variable speed electric type.

The controllers 36c, 42c, 50c control the respective high pressure fuel pump 36, variable output lubricant pump 42 and motor 50. The controllers 36c, 42c, 50c may be utilized to assure a minimum output pressure to satisfy both oil lubrication and actuation needs. It should be understood by those skilled in the art with the benefit of this disclosure that these functions may be enacted in either dedicated hardware circuitry or programmed software routines capable of execution in a microprocessor based electronics control embodiment. In one non-limiting embodiment, the controllers $36c$, $42c$, $50c$ may be a portion of a flight control computer, a portion of a central vehicle control, an interactive vehicle dynamics module, a stand-alone line replaceable unit or other system to include a single higher level controller.

Actuation return lubricant from the actuator system 60 can be returned through return line 62 upstream of the variable output lubricant pump 42. Alternatively, the return lubricant from the actuator system 60 may be returned to the lubricant tank 40.

Figure 2:
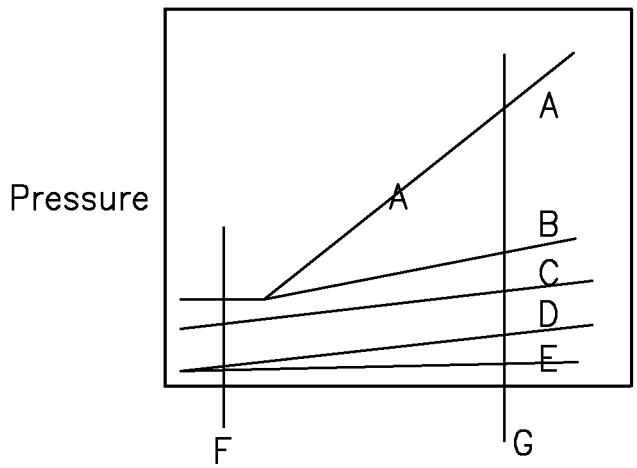
FIG. 2 is a graphical representation of actuator pressures for a fuel system and lubrication system driven actuators.

Typical fuel supply pressures vary between approximately 200 to 2000 PSIA (1378951 to 13789514 Pa) while typical lubricant supply pressures vary between approximately 100 to 400 PSIA (2757902 to 27579029 Pa) (FIG. 2). When driven by the lubrication system 26, the actuator system 60 need only be designed for the lower pressures and lower range of pressures which advantageously improves actuator force balance, maximum output limits, structural wall size and material combinations. The reduction in minimum to maximum pressure range provided by the lubrication system 26 provides a relatively close match between ambient actuator pressure and lubricant sump pressure which facilitates a reduced actuator size, lighter actuator design, or combination thereof.

The lubrication system 26 driven actuator system 60 further permits relatively lighter weight actuators manufactured from materials such as aluminum and composites, as the actuator system 60 operates at lower pressures and are not subject to significant waste power at maximum pressure operations such as takeoff. That is, the lower pressure of the lubrication system 26 does not require pressure toping features typically required with fueldraulics to prevent high output loads at maximum fuel flow conditions. Also, potential transient shortfalls are more readily absorbed by the lubrication system 26 as compared to the fuel system 24 which facilities transient sizing optimization.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A lubrication system for a gas turbine engine comprising:
   an actuator system;
   a variable output lubricant pump operable to supply lubricant to said actuator system, said variable output lubricant pump is operable to supply lubricant to a lubricant distribution system and gas turbine engine bearing components of the lubricant distribution system; and
   a scavenge system in fluid communication with said lubricant distribution system, said scavenge system includes a centrifugal air/lubricant separator selectively driven by a motor, said motor is operated to minimize a residence time within a lubricant tank downstream of said centrifugal air/lubricant separator.

2. The lubrication system as recited in claim 1, wherein said actuator system provides variable engine geometries.

3. The lubrication system as recited in claim 1, wherein said actuator system includes a stator vane actuator.

4. The lubrication system of claim 1, wherein the scavenge system further includes a scavenge pump, the scavenge pump being driven by the motor.

5. A gas turbine engine system comprising:
   a gas turbine engine;
   a lubricant distribution system for said gas turbine engine;
   an actuator system for said gas turbine engine to provide variable engine geometries;
   a lubricant system operable to supply lubricant to said actuator system and said lubricant distribution system;
   a fuel system operable to supply a burn flow to a combustor of said gas turbine engine, said fuel system is operable to supply only said burn flow; and
   a scavenge system in fluid communication with said lubricant distribution system, said scavenge system includes a centrifugal air/lubricant separator selectively driven by a motor operated to minimize a residence time within a lubricant tank downstream of said centrifugal air/lubricant separator.

6. The gas turbine engine system as recited in claim 5, wherein said actuator system includes an actuation return which communicates lubricant from downstream of said actuation system to upstream of a variable output lubricant pump of said lubricant system.

7. The gas turbine engine system as recited in claim 6, wherein said actuator system comprises a stator vane actuator.

8. The gas turbine engine system as recited in claim 5, further comprising a scavenge pump driven by the motor.

* * * * *